Patented July 15, 1924.

1,501,420

UNITED STATES PATENT OFFICE.

WERNER SIEBERT, OF LAUFENBURG, AARGAU, SWITZERLAND, ASSIGNOR TO NITRUM AKTIENGESELLSCHAFT, OF ZURICH, SWITZERLAND, A CORPORATION OF SWITZERLAND.

ELECTRODE FOR HIGH-TENSION ARC FURNACES.

No Drawing. Application filed May 13, 1922. Serial No. 560,730.

*To all whom it may concern:*

Be it known that I, WERNER SIEBERT, a citizen of the Republic of Germany, residing at Laufenburg, Aargau, Switzerland, have invented certain new and useful Improvements in an Electrode for High-Tension Arc Furnaces, of which the following is a specification.

Although electrodes of arc furnaces are generally cooled by water, the consumption of electrode material has proved to be very heavy. It is therefore of great importance in arc furnaces, such as are used for gas reactions, for example for the oxidation of atmospheric nitrogen, what kind of material is employed for the electrodes carrying the arc. This material must be able to stand extreme high temperatures without being materially affected and besides must be such that any particles carried off by the current do not influence the reaction products in any undesired manner. Experience has shown that electrodes of ordinary cast iron or forged iron have a bad influence in the furnaces which are used for the production of nitric oxydes, the yield being considerably diminished probably due to a catalytic influence.

Now it has been found that the yield of nitrous oxydes is increased considerably if instead of using ordinary for the material of the electrodes cast iron, forged iron or steel, a very pure iron containing almost no carbon is employed. Experiments have shown that the concentration of the nitrous oxydes is increased from 1.5% to about 2% at the same current consumption and for the same amount of air dealt with per kilowatt hour. At the same time the pure iron has the advantage of having a very much higher melting point than the other sorts of iron, so that its consumption is much smaller. This pure iron is advantageously produced in electric steel furnaces. It was found that the maximum contents of carbon which can be allowed without influencing the yield, is 0.1%, while the presence in some degree but not exceeding 10% of a heavy metal, such as manganese, chromium, nickel or cobalt, as generally contained in alloy in electro steel, has shown no bad influence whatever.

I claim:

1. An electrode for an electric high tension arc consisting of iron which is otherwise pure but contains carbon to an extent not exceeding 0.1%.

2. An electrode for an electric high tension arc consisting of iron which is otherwise pure but contains carbon to an extent not exceeding 0.1% and in alloy a heavy metal, such as manganese, chromium, nickel or cobalt, to an extent not exceeding 10%.

In testimony whereof I affix my signature.

DR. WERNER SIEBERT.